United States Patent
Iyer et al.

(10) Patent No.: US 8,683,408 B2
(45) Date of Patent: Mar. 25, 2014

(54) SEQUENTIAL SIZING IN PHYSICAL SYNTHESIS

(71) Applicant: Synopsys, Inc., Mountain View, CA (US)

(72) Inventors: Mahesh A. Iyer, Fremont, CA (US); Amir H. Mottaez, Los Altos, CA (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 13/665,833

(22) Filed: Oct. 31, 2012

(65) Prior Publication Data

US 2013/0145331 A1 Jun. 6, 2013

Related U.S. Application Data

(60) Provisional application No. 61/566,464, filed on Dec. 2, 2011.

(51) Int. Cl.
*G06F 17/50* (2006.01)

(52) U.S. Cl.
CPC .......... *G06F 17/5081* (2013.01); *G06F 17/505* (2013.01)
USPC ........... 716/113; 716/133; 716/134; 716/135; 716/104; 703/16

(58) Field of Classification Search
CPC ............................ G06F 17/5081; G06F 17/505
USPC ............ 716/113, 133, 134, 135, 104; 703/16
See application file for complete search history.

(56) References Cited

U.S. PATENT DOCUMENTS

| | | | | |
|---|---|---|---|---|
| 5,880,967 A | * | 3/1999 | Jyu et al. | 716/113 |
| 5,896,300 A | * | 4/1999 | Raghavan et al. | 716/113 |
| 6,223,334 B1 | * | 4/2001 | Suaris et al. | 716/122 |
| 6,367,060 B1 | * | 4/2002 | Cheng et al. | 716/114 |
| 6,430,731 B1 | * | 8/2002 | Lee et al. | 716/108 |
| 6,810,340 B2 | * | 10/2004 | Shimazaki et al. | 702/65 |
| 6,904,585 B2 | * | 6/2005 | Brittain et al. | 716/114 |
| 7,246,340 B1 | * | 7/2007 | Van Antwerpen et al. | 716/104 |
| 7,594,203 B2 | * | 9/2009 | de Dood et al. | 716/132 |
| 7,716,612 B1 | * | 5/2010 | Gupta et al. | 716/132 |
| 2001/0007144 A1 | * | 7/2001 | Terazawa | 716/6 |
| 2001/0010092 A1 | * | 7/2001 | Kato | 716/10 |
| 2002/0022949 A1 | * | 2/2002 | Yonezawa et al. | 703/14 |
| 2003/0093765 A1 | * | 5/2003 | Lam et al. | 716/18 |
| 2004/0199884 A1 | * | 10/2004 | Brittain et al. | 716/4 |
| 2004/0250225 A1 | * | 12/2004 | Tetelbaum et al. | 716/6 |
| 2005/0177356 A1 | * | 8/2005 | Yonezawa | 703/14 |

(Continued)

*Primary Examiner* — Phallaka Kik
(74) *Attorney, Agent, or Firm* — Park, Vaughan, Fleming & Dowler LLP; Laxman Sahasrabuddhe (57) ABSTRACT

Techniques and systems for optimizing a circuit design are described. In some embodiments, a sequential cell is selected for optimization. Next, the system iterates through a set of candidate sequential cells that are functionally equivalent to the sequential cell that is being optimized. The system evaluates the global timing impact of each candidate sequential cell in a highly efficient manner. For each candidate sequential cell that is evaluated, a non-timing metric and a timing metric for a candidate sequential cell are compared with the corresponding non-timing metric and timing metric for the current best sequential cell. If a candidate sequential cell improves the timing metric, or maintains the timing metric and has better non-timing metric(s), then the candidate sequential cell is stored as the current best sequential cell. Once the process completes, the current best sequential cell is the optimized cell size for the sequential cell.

21 Claims, 4 Drawing Sheets

(56) References Cited

U.S. PATENT DOCUMENTS

| | | |
|---|---|---|
| 2005/0283748 A1* | 12/2005 | Iguchi ............................... 716/6 |
| 2006/0112158 A1* | 5/2006 | Tetelbaum ..................... 708/490 |
| 2007/0050742 A1* | 3/2007 | Yonezawa ......................... 716/6 |
| 2007/0234137 A1* | 10/2007 | Oomori et al. ................. 714/710 |
| 2007/0277134 A1* | 11/2007 | Zhang et al. ...................... 716/6 |
| 2008/0178128 A1* | 7/2008 | de Dood et al. ................... 716/2 |
| 2008/0270962 A1* | 10/2008 | Chadwick et al. ................ 716/6 |
| 2009/0138838 A1* | 5/2009 | Nitta et al. ........................ 716/6 |
| 2010/0100347 A1* | 4/2010 | Buehler et al. .................. 702/79 |
| 2010/0262941 A1* | 10/2010 | Fry et al. ........................... 716/6 |
| 2010/0262942 A1* | 10/2010 | Nakamura ........................ 716/6 |
| 2011/0224965 A1* | 9/2011 | Hathaway et al. .............. 703/16 |
| 2013/0145336 A1* | 6/2013 | Iyer et al. ....................... 716/134 |

* cited by examiner

Pseudocode 300

302 • $f_{best} = current\ flip-flop$
304 • $A_{best} = Area\ of\ current\ flip-flop.$
306 • Foreach equivalent flip-flop, $FF_k$ in the technology library {
308 → ○ Foreach input i of $FF_k$, compute $D_{C_i}$.
310 → ▪ $(M_C == 0)?(D_{C_i}) : MAX(D_{C_i}, R_C)$
312 → ○ Foreach output j of $FF_k$, compute $D_{Q_j}$.
314 → ▪ $(M_Q == 0)?(D_{Q_j}) : MAX(D_{Q_j}, R_Q)$
316 → ○ $FF_{cost} = \sum D_{C_i} + \sum D_{Q_j}$
318 → ○ If ( ($FF_{Cost} < K$) OR (($FF_{cost} == K$) && $Area(FF_k) < A_{best}$)) {
320 → ▪ $K = FF_{cost}$
322 → ▪ $f_{best} = FF_k$
324 → ▪ $A_{best} = Area(FF_k)$
   ○ }
 • }

SEQUENTIAL SIZING IN PHYSICAL SYNTHESIS

RELATED APPLICATION

This application claims priority to U.S. Provisional Application Ser. No. 61/566,464, by Mahesh A. Iyer and Amir H. Mottaez, filed on 2 Dec. 2011, the contents of which are herein incorporated by reference.

BACKGROUND

1. Technical Field

This disclosure relates to electronic design automation (EDA). More specifically, this disclosure relates to sequential sizing in physical synthesis.

2. Related Art

The goal of circuit synthesis is to convert a high-level description of a circuit design into an implementation that meets a set of timing constraints, and at the same time optionally optimizes one or more metrics, such as area, leakage power, etc.

Figure 1:
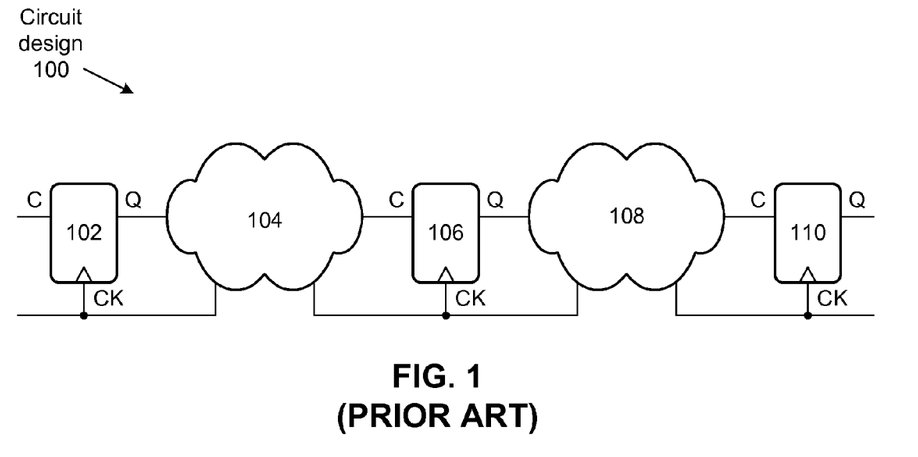
FIG. 1 illustrates a circuit design comprising sequential cells that are coupled to combinational logic regions.

FIG. 1 illustrates a circuit design comprising sequential cells that are coupled to combinational logic regions. Circuit design 100 includes sequential cells 102, 106, and 110 that are coupled to combinational logic regions 104 and 108. During optimization, a circuit design (e.g., circuit design 100) is typically partitioned into combinational logic regions (e.g., combinational logic regions 104 and 108) that only have combinational cells, and each combinational logic region is optimized based on one or more metrics. As shown in FIG. 1, sequential cells (e.g., sequential cells 102, 106, and 108) are typically the startpoints and the endpoints of each combinational logic region. The startpoint is usually also referred to as the launch side of the sequential and the endpoint is usually also referred to as the capture side of the sequential. The launch delay typically includes the delay of the CK→Q timing arc in the sequential cell, whereas the capture delay includes the setup time of the sequential, which is represented as the CK→D-pin timing arc in the sequential cell.

Sequential sizing is a crucial step in any physical synthesis system, because it very closely affects the delay of the circuit on the launch as well as the capture sides. Sequential sizing is a particularly difficult problem in physical synthesis because sizing sequential cells affects delays on both the launch and the capture side. Specifically, up-sizing a sequential cell may improve its launch delay, but could degrade the capture delay. Conversely, down-sizing the sequential cell may degrade its launch delay, but could improve the capture delay. Conventional approaches to logic and physical synthesis rely on iterative approaches to optimizing combinational logic (while keeping the sequential cells fixed to their current sizes) and then separately optimizing sequential cells before again iteratively optimizing the combinational logic.

SUMMARY

Some embodiments described herein provide techniques and systems for optimizing a circuit design. In some embodiments, a sequential cell is selected for optimization. Next, the system iterates through a set of library cells (which are referred to as candidate sequential cells in this disclosure) that are functionally equivalent to the sequential cell that is being optimized. The system evaluates the global timing impact of each candidate sequential cell in a computationally efficient manner. In some embodiments, the system keeps track of the current best sequential cell. Non-timing metrics (e.g., area, leakage power, etc.) and a timing metric for a candidate sequential cell are compared with the corresponding non-timing metric and timing metric, respectively, for the current best sequential cell. If the candidate sequential cell improves the timing metric or improves the non-timing metric without degrading the timing metric, then the candidate sequential cell is stored as the current best sequential cell. Once the process completes, the current best sequential cell (which corresponds to the optimal size) can be reported as the optimized cell and/or can be instantiated in the circuit design in place of the original sequential cell that was selected for optimization.

In some embodiments, the system is capable of evaluating the global timing impact in a computationally efficient manner because the system includes at least the following features: (1) computation of the timing margin (which represents the amount of timing degradation that can be tolerated at a given pin without creating new timing violations at a corresponding timing endpoint or worsening existing timing violations at a corresponding timing endpoint) at one or more pins of the sequential cell that is being optimized, and (2) computation of a transition-induced delay penalty at one or more pins of the candidate sequential cell to capture the global delay impact of a change in the transition value that will occur when the sequential cell is replaced by the candidate sequential cell. Note that both these features capture global delay impact within the local context of the sequential cell being sized.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein. In this disclosure, when the term "and/or" is used with a list of entities, it refers to all possible combinations of the list of entities. For example, the phrase "X, Y, and/or Z" covers the following cases: (1) only X; (2) only Y; (3) only Z; (4) X and Y; (5) X and Z; (6) Y and Z; and (7) X, Y, and Z.

Overview of an Electronic Design Automation (EDA) Flow

An EDA flow can be used to create a circuit design. Once the circuit design is finalized, it can undergo fabrication, packaging, and assembly to produce integrated circuit chips.

An EDA flow can include multiple steps, and each step can involve using one or more EDA software tools. Some EDA steps and software tools are described below. These examples of EDA steps and software tools are for illustrative purposes only and are not intended to limit the embodiments to the forms disclosed.

Some EDA software tools enable circuit designers to describe the functionality of the circuit design. These tools also enable circuit designers to perform what-if planning to refine functionality, check costs, etc. During logic design and functional verification, the HDL (hardware description language), e.g., SystemVerilog, code for modules in the system can be written and the design can be checked for functional accuracy, e.g., the design can be checked to ensure that it produces the correct outputs.

During synthesis and design for test, the HDL code can be translated to a netlist using one or more EDA software tools. Further, the netlist can be optimized for the target technology, and tests can be designed and implemented to check the finished chips. During netlist verification, the netlist can be checked for compliance with timing constraints and for correspondence with the HDL code.

During design planning, an overall floorplan for the chip can be constructed and analyzed for timing and top-level routing. During physical implementation, circuit elements can be positioned in the layout (placement) and can be electrically coupled (routing).

During analysis and extraction, the circuit's functionality can be verified at a transistor level and parasitics can be extracted. During physical verification, the design can be checked to ensure correctness for manufacturing, electrical issues, lithographic issues, and circuitry.

During resolution enhancement, geometric manipulations can be performed on the layout to improve manufacturability of the design. During mask data preparation, the design can be "taped-out" to produce masks which are used during fabrication.

Notation

Figure 2:
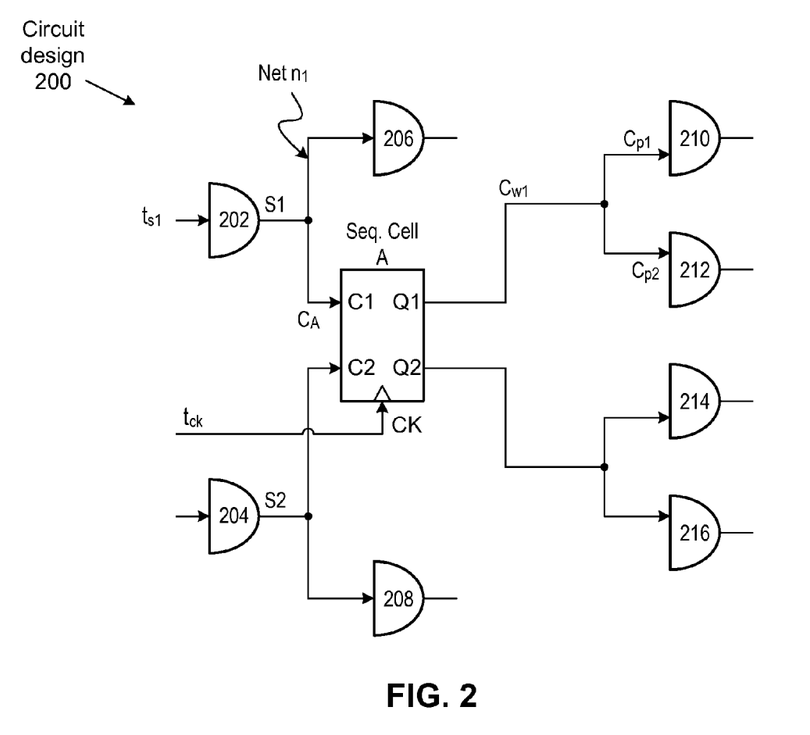
FIG. 2 illustrates a circuit design in which a sequential cell is to be optimized in accordance with some embodiments described herein.

FIG. 2 illustrates a circuit design in which a sequential cell is to be optimized in accordance with some embodiments described herein. Circuit design 200 includes gates 202-216 and sequential cell A. Sequential cell A has two input pins C1 and C2 (the capture side), two output pins Q1 and Q2 (the launch side), and clock pin CK. $C_A$ is the input capacitance at input pin C1 of sequential cell A. The input capacitances of the input pins of gates 210 and 212 are $C_{p1}$ and $C_{p2}$, respectively. Pin S1 (i.e., the output pin of gate 202) is coupled to input pin C1 and the input of gate 206 through net $n_1$. $C_{w1}$ is the capacitance of the wire topology that electrically connects the output pin Q1 with the input pins of gates 210 and 212.

$t_{ck}$ is the transition time on the clock pin CK. $t_{s1}$ is the transition time on the input pin of gate 202. $L_{Q1}$ is the load on the Q1 pin, where $L_{Q1}=C_{p1}+C_{p2}+C_{w1}$. $L_{S1}$ is the load of the S1 pin, where $L_{S1}=C_A+C_{wA}+\Sigma C_{p_i}$, and where $\Sigma C_{p_i}$ is computed over all fanouts of S1 other than A (for example, gate 206 is a fanout S1 other than A, and hence the input capacitance of gate 206 would be one of the terms in $\Sigma C_{p_i}$).

$TD_{Q1}$ is the transition-induced delay on Q1 as a result of changes in output transition at Q1. Essentially when a sequential cell is sized, the output transition on the Q pins change. This would change the delay of the loads driven by the Q pins. To account for this effect without evaluating the load pins, we use a transition-induced delay that is a delay penalty that is added to the arrival time of the Q pin. Further details for computing and using transition-induced delay are described below.

Specifically, $TD_{Q1}$ is computed as $(t_{Q1_{new}}-t_{Q1})*t_{slope}$, where $t_{slope}$ is computed for most critical fanout of Q1. The transition-effect coefficient $t_{slope}$, models the effect that a change in input transition has on the output delay. Further details of computing transition-effect coefficients and transition-induced delays are described in U.S. patent application Ser. No. 13/629,400, entitled "Modeling transition effects for circuit optimization," filed on 27 Sep. 2012, the contents of which are herein incorporated by reference in their entirety. In some embodiments, this transition-induced delay is also computed for all the fanouts of Q1 and the worst delay is induced as a penalty on Q1. $TD_{Q2}$ is the transition-induced delay on Q2 as a result of changes in output transition at Q2. The transition-induced delay is also used for computing the source driver's delay on the capture side. Let $TD_{S1}$ be the transition-induced delay on S1 as a result of changes in output transition at S1.

$M_{Q1}$ is the margin at Q1, which represents the amount of delay degradation that can be tolerated at Q1. Embodiments for computing and using margin values are described in U.S. patent application Ser. No. 12/783,915, entitled "Global timing modeling within a local context," filed on 20 May 2010, the contents of which are herein incorporated by reference in their entirety. $M_{Q2}$ is the margin at Q2, which represents the amount of delay degradation that can be tolerated at Q2. $M_{C1}$ is the margin of S1, which represents the amount of delay degradation that can be tolerated at S1. $M_{C2}$ is the margin of S2, which represents the amount of delay degradation that can be tolerated at S2.

$D_{Q1}$ is the delay at Q1 that is computed for each size of the sequential cell. $D_{Q2}$ is the delay at Q2 that is computed for each size of the sequential cell. $D_{C1}$ is the delay at C1 (from input of S1) that is computed for each size of the sequential cell. $D_{C2}$ is the delay at C2 (from input of S2) that is computed for each size of the sequential cell. $D_{CKQ1}$ is the delay of timing arc CK→Q1. $D_{CKQ1}$ is a function of $t_{ck}$ and $L_{Q1}$, i.e., $D_{CKQ1}=f(t_{ck},L_{Q1})$. $D_{CKQ2}$ is the delay of timing arc CK→Q2. $D_{CKQ2}$ is a function of $t_{ck}$ and $L_{Q2}$, i.e., $D_{CKQ2}=f(t_{ck},L_{Q2})$. $D_{S1}$ is the delay of S1, and is a function of $t_{S1}$ and $L_{S1}$, i.e., $D_{S1}=f(t_{S1},L_{S1})$. $D_w$ is the wire delay to the critical pin on net $n_1$.

Using the above notation, the following relationships can be derived:

$$D_{Q1}=D_{CKQ1}+TD_{Q1},$$

$$D_{Q2}=D_{CKQ2}+TD_{Q2}, \text{ and}$$

$$D_{C1}=D_{S1}+TD_{S1}+D_w.$$

The value of $TD_{S1}$ is computed as follows. If the minimum margin value that was propagated to S1 came from A, then $TD_{S1}$ is the setup timing arc delay ($\delta$) of A, which is given by $\delta=f(t_{ck},t_{C1})$, where $t_{C1}=f(t_{S1}, C_A+C_{wA}+\Sigma C_{p_i})$, and where $\Sigma C_{p_i}$ is computed over all fanouts of S1 other than A, and $D_w$ is the new wire delay from $S_1$ to $C_1$. On the other hand, if the minimum margin value that was propagated to S1 came from a fanout other than A, then $TD_{S1}=(t_{slope}$ of the fanout)* (change in output transition time on S1), and $D_w$ is the new wire delay from $S_1$ to the fanout.

In some embodiments described herein, the wire delays (e.g., $D_w$) are computed in an incremental fashion as described in U.S. patent application Ser. No. 13/485,600, entitled "Incremental Elmore delay calculation," filed on 31 May 2012, the contents of which are herein incorporated by reference in their entirety.

Process for Sizing a Sequential Cell

Figure 3:
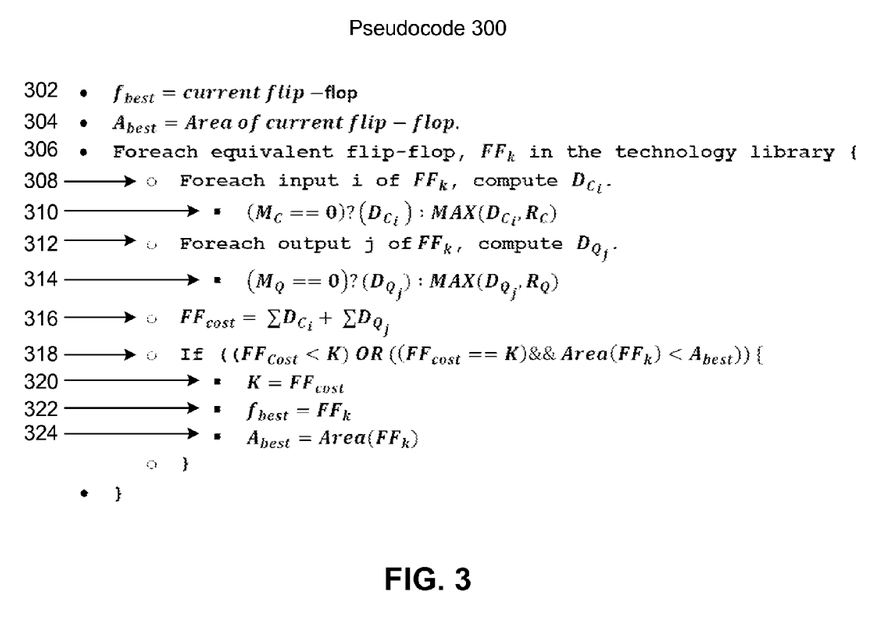
FIG. 3 presents pseudocode that illustrates a process for sizing a sequential cell in accordance with some embodiments described herein.

FIG. 3 presents pseudocode that illustrates a process for sizing a sequential cell in accordance with some embodiments described herein.

Pseudocode 300 shown in FIG. 3 sizes a flip-flop by finding a size that produces the best launch and capture delays with minimal area. Before pseudocode 300 begins, the following values can be computed for the sequential cell that is currently instantiated in the circuit design.

$R_Q = M_Q + D_Q$. $R_Q$ represents the maximum allowed delay on the launch side, $M_Q$ represents the margin on the Q pin, and $D_Q$ represents the delay on the Q pin. The values of $M_Q$ and $D_Q$ can be computed as explained above (see e.g., the explanation for computing the values of $M_{Q1}$ and $D_{Q1}$).

$R_C = M_C + D_C$. $R_C$ represents the maximum allowed delay on the capture side, $M_C$ represents the margin on the C pin, and $D_C$ represents the delay on the C pin. The values of $M_C$ and $D_C$ can be computed as explained above (see e.g., the explanation for computing the values of $M_{C1}$ and $D_{C1}$).

$K = R_Q + R_C$. K represents the cost function that is used in some embodiments to determine whether or not a candidate sequential cell degrades timing of the circuit design.

Variable $f_{best}$ can store the identity of the current best flip-flop. In line 302, $f_{best}$ is initialized to be equal to the cell that is currently instantiated in the circuit design. When the process illustrated in pseudocode 300 is performed, a better (i.e., more optimal) flip-flop may be found, and at that point the process will store an identifier for the recently found flip-flop in variable $f_{best}$. In line 304, the area of the currently best known flip-flop is stored in variable $A_{best}$.

In line 306, the process begins an iterative loop that iterates over all flip flops in the technology library that are functionally equivalent to the flip-flop that is being sized. The variable $FF_k$ represents the functionally equivalent flip-flop in the technology library that is being considered in the current iteration of the iterative loop.

Lines 308 and 310 then compute the value of $D_{C_i}$ for each input i of flip-flow $FF_k$. Specifically, first the value of $D_{C_i}$ is computed as explained above (see e.g., the explanation for computing the value of $M_{C1}$). Next, the value of $D_{C_i}$ is adjusted using the expression shown in line 310. Specifically, if $M_C$ is equal to 0 (i.e., the margin at the C pin is equal to 0 and therefore any degradation in the delay will result in a degradation of timing), then $D_{C_i}$ remains unchanged. In a variation, if $M_C$ is equal to 0, then $D_{C_i}$ is equal to the maximum of $D_{C_i}$ and a required time at the C pin. However, if $M_C$ is not equal to 0 (i.e., the margin at the C pin is greater than 0), then $D_{C_i}$ is adjusted to be equal to the maximum of $D_{C_i}$ or $R_C$.

Lines 312 and 314 similarly compute the value of $D_{Q_j}$ for each output j of flip-flop $FF_k$. Specifically, first the value of $D_{Q_j}$ is computed as explained above (see e.g., the explanation for computing the value of $M_{Q1}$). Next, the value of $D_{Q_j}$ is adjusted using the expression shown in line 314. Specifically, if $M_Q$ is equal to 0 (i.e., the margin at the Q pin is equal to 0 and therefore any degradation in the delay will result in a degradation of timing), then $D_{Q_j}$ remains unchanged. In a variation, if $M_Q$ is equal to 0, then $D_{Q_j}$ is equal to the maximum of $D_{Q_j}$ and a required time at the D pin. However, if $M_Q$ is not equal to 0 (i.e., the margin at the Q pin is greater than 0), then $D_{Q_j}$ is adjusted to be equal to the maximum of $D_{Q_j}$ or $R_Q$.

Line 316 then computes a cost metric ($FF_{cost}$) corresponding to flip-flop $FF_k$ as the summation of the capture delays on all D pins and launch delays on all Q pins. Next, line 318 checks if flip-flop $FF_k$ either reduces the cost metric or reduces area without increasing the cost metric. If either of these conditions is true, then lines 320-324 are executed in which $FF_k$ is selected as the current best flip-flop. Specifically, the current optimal value for the cost function K is set to be equal to $FF_{cost}$ in line 320, variable $f_{best}$ is set to be equal to $sFF_k$, and variable $A_{best}$ (the area of the current best flip-flop) is set to be equal to the area of flip-flop $FF_k$.

The computations that are performed in lines 310 and 314, and the condition that is evaluated in line 318 enables the process to tradeoff timing versus area in the sense that a minimal-area solution that meets the delay constraints (as modeled by the cost function) is achieved. Specifically, if a flip-flop has positive margins at the inputs and outputs, then pseudocode 300 (in particular the operations performed in lines 310, 314, and 318) allows the flip-flop to be downsized in exchange for reducing the margins. Note that, as long as the input and output pins have positive margins, reducing the size of the flip-flop is a safe operation from a timing standpoint to the extent of the available margins.

Pseudocode 300 is for illustration purposes only and is not intended to limit the embodiments described herein. Many variations and modifications to pseudocode 300 will be apparent to a person having ordinary skill in the art. For example, pseudocode 300 can be adapted to use a different timing metric and/or optimize a non-timing metric that is different from area. For example, some embodiments can optimize leakage power instead of optimizing area or simultaneously optimize area and leakage power.

Figure 4:
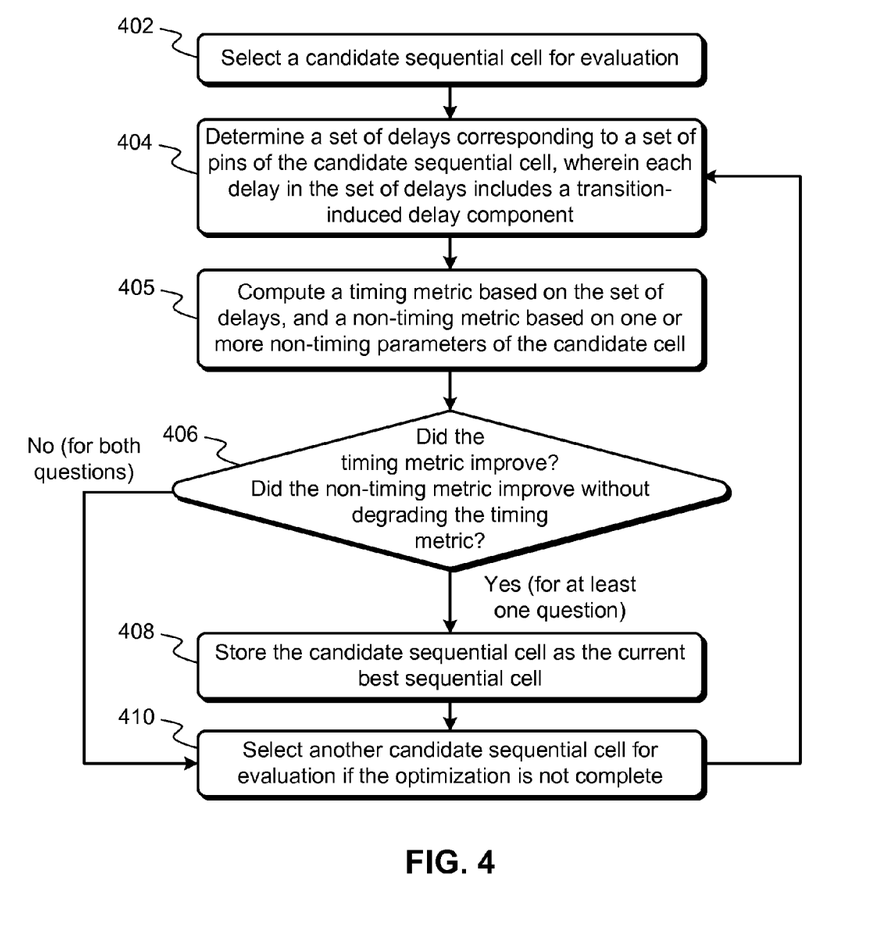
FIG. 4 presents a flowchart that illustrates a process for optimizing a circuit design in accordance with some embodiments described herein.

FIG. 4 presents a flowchart that illustrates a process for optimizing a circuit design in accordance with some embodiments described herein.

The process begins by a system selecting a candidate sequential cell for evaluation (operation 402). Note that, in this iterative process, the candidate sequential cell is being considered as a replacement for the current best sequential cell in the design. Next, the system determines a set of delays corresponding to a set of pins of the candidate sequential cell, wherein each delay in the set of delays includes a transition-induced delay component (operation 404). As explained below, the transition-induced delay component can be computed using a transition-effect coefficient.

Next, the system can compute a timing metric based on the set of delays, and a non-timing metric based on one or more non-timing parameters of the candidate cell (operation 405).

In some embodiments, the timing metric can be determined as follows. First, a set of adjusted delays are determined based on the set of delays. An adjusted delay for a pin can be computed using lines 310 and 314 in the pseudocode 300 shown in FIG. 3. Note that the margin for a pin is calculated for the original sequential cell (i.e., the margin does not correspond to the candidate cell). If a margin for the pin is equal to zero, then the adjusted delay is equal to the delay for the pin. In a variation of this embodiment, if the margin for the pin is equal to zero, then the adjusted delay is equal to the greater of the delay for the pin and a required time for the pin that was propagated backward from a timing end-point. On the other hand, if the margin for the pin is greater than zero, then the adjusted delay for the pin is equal to the greater of the delay for the pin and a maximum allowed delay for the pin. Note that the maximum allowed delay for a pin is equal to the sum of the delay and the margin for the pin, wherein the delay and the margin are computed for the original sequential cell (i.e., not the candidate sequential cell). Recall that, in FIG. 3, the maximum allowed delay is denoted by $R_C$ on the capture side and by $R_Q$ on the launch side.

Next, the timing metric can be determined based on the set of adjusted delays. Specifically, in some embodiments, the timing metric can be a sum of the set of adjusted delays. In some embodiments, the timing metric can be a tuple of a launch delay and a capture delay, wherein the launch delay is computed by summing delays in the set of adjusted delays corresponding to output pins in the set of pins, wherein the capture delay is computed by summing delays in the set of adjusted delays corresponding to input pins in the set of pins, and wherein the timing metric degrades if either the launch delay or the capture delay degrades. In some embodiments, the timing metric can be a vector of the set of adjusted delays, wherein the timing metric degrades if at least one adjusted delay in the set of adjusted delays degrades.

The system can then determine if replacing the current best sequential cell by the candidate sequential cell improves the timing metric or improves the non-timing metric without degrading the timing metric (operation 406). If so, the system can store the candidate sequential cell as the current best sequential cell (operation 408). If not, the system can select another candidate sequential cell for evaluation if the optimization is not complete (operation 410), and evaluate the new candidate sequential cell by returning to operation 404.

In some embodiments, the delay computations can be performed in a computationally efficient manner using a specific numerical delay model for each candidate sequential cell that is considered as a replacement. The term "specific numerical delay model" refers to a numerical delay model that models the delay behavior of a particular timing arc of a particular library cell, or the delay behavior of a particular library cell. A specific numerical delay model is defined using a specific logical effort value and a specific parasitic delay value. The term "generic numerical delay model" refers to a numerical delay model that models an aggregated delay behavior of either a timing arc of a library cell type or the library cell type itself. A generic numerical delay model is defined using a generic logical effort value and a generic parasitic delay value. Examples of systems and techniques for determining and using specific and generic numerical delay models are described in U.S. patent application Ser. No. 13/450,178, entitled "Numerical delay model for a technology library cell and/or a technology library cell type," the contents of which are herein incorporated by reference in their entirety.

Transition-Induced Delay Computation

A transition-effect coefficient represents a linear relationship between a change in the input transition and a change in the output delay. One example of a transition-effect coefficient is a transition-induced delay slope ($t_{slope}$), which can be computed for every input of a gate given its current load. In some embodiments, the $t_{slope}$ values are pre-computed for each of the discrete input transition and output load values of the non-linear delay model (NLDM) table, and stored in the NLDM table. In other embodiments, the $t_{slope}$ value is computed on-the-fly for the current input transition and output load. For example, $t_{slope}$ can be computed using the following expression:

$$t_{slope} = \frac{\text{Delay}(IT + \varepsilon, OL) - \text{Delay}(IT - \varepsilon, OL)}{2 \cdot \varepsilon}. \quad (1)$$

Equation (1) was presented for illustration purposes only. It will be apparent to those of ordinary skill in the art that many other analytical expressions can be used to compute the slope. For example, instead of using Equation (1), the slope can be computed as follows:

$$t_{slope} = \frac{\text{Delay}(IT + \varepsilon, OL) - \text{Delay}(IT, OL)}{\varepsilon}. \quad (2)$$

In the above two equations, "IT" is the input transition value and "OL" is the output load value. The "Delay" function returns (e.g., by performing a NLDM table lookup) the output delay value that corresponds to the input transition and output load values that were provided as arguments to the function, and e is a small perturbation value (i.e., small compared to the value of IT) that is used for computing the slope.

During optimization (or sizing) of a sequential cell, the effect of the change in the output transition of the sequential cell (note that the output transition changes when the sequential cell is replaced by the candidate sequential cell), and the ensuing change in the delay of the downstream gates caused by this change, can be modeled as a transition-induced penalty in the delay of the sequential cell being optimized.

The transition-induced penalty (4) can be computed as follows:

$$d_{tp} = (s_{new} - s_{orig}) \cdot t_{slope}, \quad (3)$$

where, $s_{new}$ and $s_{orig}$ are the new and original output transitions, respectively, at the output of the sequential cell. The original output transition corresponds to the transition for the current best sequential cell, and the new output transition corresponds to the transition after replacing the current best sequential cell with the candidate sequential cell. Each library cell corresponds to one or more NLDM tables. When a candidate sequential cell is considered as a replacement, the input transition remains the same, but a new output transition value $s_{new}$ is determined based on the NLDM table corresponding to the candidate sequential cell. Further details of computing transition-effect coefficients and transition-induced delays are described in U.S. patent application Ser. No. 13/629,400, entitled "Modeling transition effects for circuit optimization," filed on 27 Sep. 2012, the contents of which are herein incorporated by reference in their entirety.

Computer System

Figure 5:
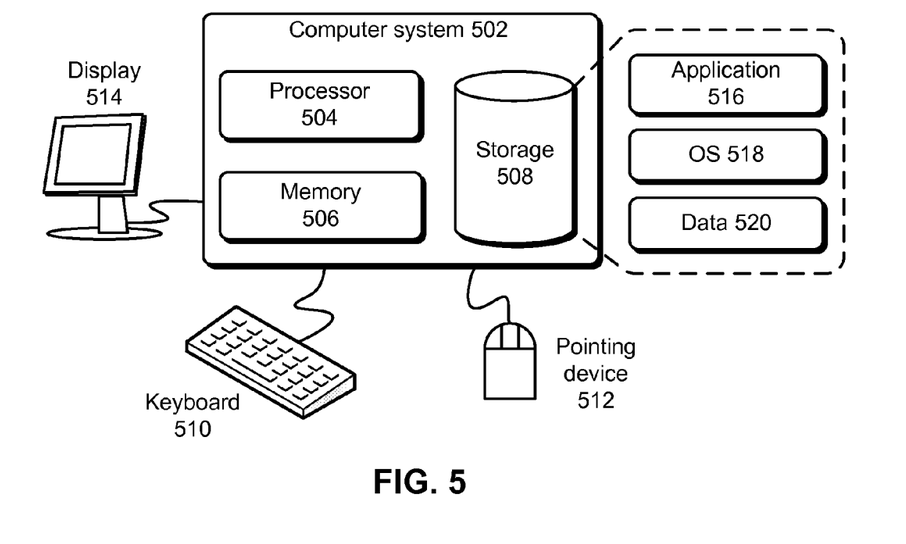
FIG. 5 illustrates a computer system in accordance with an embodiment of the present invention.

FIG. 5 illustrates a computer system in accordance with an embodiment of the present invention.

A computer system can generally be any system that can perform computations. Specifically, a computer system can be a microprocessor, an application specific integrated circuit, a distributed computing system, a cloud computing system, or any other computing system now known or later developed. Computer system 502 comprises processor 504, memory 506, and storage 508. Computer system 502 can be coupled with display 514, keyboard 510, and pointing device 512. Storage 508 can generally be any device that can store data. Specifically, a storage device can be a magnetic, an optical, or a magneto-optical storage device, or it can be based on flash memory and/or battery-backed up memory. Storage 508 can store application 516, operating system 518, and data 520.

Application 516 can include instructions that when executed by computer 502 cause computer 502 to perform one or more processes that are implicitly or explicitly described in this disclosure (e.g., the processes illustrated in FIGS. 3 and 4). Data 520 can include any data that is inputted into or outputted by application 516.

The above description is presented to enable any person skilled in the art to make and use the embodiments. Various modifications to the disclosed embodiments will be readily apparent to those skilled in the art, and the general principles defined herein are applicable to other embodiments and applications without departing from the spirit and scope of the present disclosure. Thus, the present invention is not limited to the embodiments shown, but is to be accorded the widest scope consistent with the principles and features disclosed herein.

The data structures and code described in this disclosure can be partially or fully stored on a non-transitory computer-readable storage medium and/or a hardware module and/or hardware apparatus. A non-transitory computer-readable storage medium includes all computer-readable storage mediums with the sole exception of a propagating electromagnetic wave or signal. Specifically, a non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed.

The methods and processes described in this disclosure can be partially or fully embodied as code and/or data stored in a non-transitory computer-readable storage medium or device, so that when a computer system reads and executes the code and/or data, the computer system performs the associated methods and processes. The methods and processes can also be partially or fully embodied in hardware modules or apparatuses. Note that the methods and processes can be embodied using a combination of code, data, and hardware modules or apparatuses.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for optimizing a circuit design, the method comprising:
   determining a set of delays corresponding to a set of pins of a candidate sequential cell that is being considered as a replacement for a sequential cell in the circuit design, wherein each delay in the set of delays includes a transition-induced delay component that is computed using a transition-effect coefficient, and wherein each transition-induced delay component estimates an impact that a change in a transition at a pin has on delays of downstream gates;
   computing a timing metric based on the set of delays, and a non-timing metric based on one or more non-timing parameters of the candidate cell; and
   determining, by using a computer, that replacing the sequential cell with the candidate sequential cell improves the circuit design if the timing metric improves, or the non-timing metric improves without degrading the timing metric.

2. The method of claim 1, wherein the non-timing metric is based on at least one of: an area of the candidate cell and a leakage power of the candidate cell.

3. The method of claim 1, wherein said computing the timing metric includes:
   determining a set of adjusted delays based on the set of delays, wherein an adjusted delay for a pin is equal to the delay for the pin if a margin for the pin is equal to zero, wherein the margin for the pin corresponds to the sequential cell, and wherein the adjusted delay for the pin is equal to the greater of the delay for the pin and a maximum allowed delay for the pin if the margin for the pin is greater than zero; and
   determining the timing metric based on the set of adjusted delays.

4. The method of claim 3, wherein the timing metric is a sum of the set of adjusted delays.

5. The method of claim 3, wherein the timing metric is a tuple of a launch delay and a capture delay, wherein the launch delay is computed by summing delays in the set of adjusted delays corresponding to output pins in the set of pins, wherein the capture delay is computed by summing delays in the set of adjusted delays corresponding to input pins in the set of pins, and wherein the timing metric degrades if either the launch delay or the capture delay degrades.

6. The method of claim 3, wherein the timing metric is a vector of the set of adjusted delays, wherein the timing metric degrades if at least one adjusted delay in the vector of the set of adjusted delays degrades.

7. The method of claim 1, wherein said computing the timing metric includes:
   determining a set of adjusted delays based on the set of delays, wherein an adjusted delay for a pin is equal to the greater of the delay for the pin and a required time for the pin if a margin for the pin is equal to zero, wherein the margin for the pin corresponds to the sequential cell, and wherein the adjusted delay for the pin is equal to the greater of the delay for the pin and a maximum allowed delay for the pin if the margin for the pin is greater than zero; and
   determining the timing metric based on the set of adjusted delays.

8. A non-transitory computer-readable storage medium storing instructions that, when executed by a computer, cause the computer to perform a method for optimizing a circuit design, the method comprising:
   determining a set of delays corresponding to a set of pins of a candidate sequential cell that is being considered as a replacement for a sequential cell in the circuit design, wherein each delay in the set of delays includes a transition-induced delay component that is computed using a transition-effect coefficient, and wherein each transition-induced delay component estimates an impact that a change in a transition at a pin has on delays of downstream gates; and
   computing a timing metric based on the set of delays, and a non-timing metric based on one or more non-timing parameters of the candidate cell; and
   determining that replacing the sequential cell with the candidate sequential cell improves the circuit design if the timing metric improves, or the non-timing metric improves without degrading the timing metric.

9. The non-transitory computer-readable storage medium of claim 8, wherein the non-timing metric is based on at least one of: an area of the candidate cell and a leakage power of the candidate cell.

10. The non-transitory computer-readable storage medium of claim 8, wherein said computing the timing metric includes:
   determining a set of adjusted delays based on the set of delays, wherein an adjusted delay for a pin is equal to the delay for the pin if a margin for the pin is equal to zero, wherein the margin for the pin corresponds to the sequential cell, and wherein the adjusted delay for the pin is equal to the greater of the delay for the pin and a maximum allowed delay for the pin if the margin for the pin is greater than zero; and determining the timing metric based on the set of adjusted delays.

11. The non-transitory computer-readable storage medium of claim 10, wherein the timing metric is a sum of the set of adjusted delays.

12. The non-transitory computer-readable storage medium of claim 10, wherein the timing metric is a vector of a launch delay and a capture delay, wherein the launch delay is computed by summing delays in the set of adjusted delays corresponding to output pins in the set of pins, wherein the capture delay is computed by summing delays in the set of adjusted delays corresponding to input pins in the set of pins, and wherein the timing metric degrades if either the launch delay or the capture delay degrades.

13. The non-transitory computer-readable storage medium of claim 10, wherein the timing metric is a vector of the set of adjusted delays, wherein the timing metric degrades if at least one adjusted delay in the vector of the set of delays degrades.

14. The non-transitory computer-readable storage medium of claim 8, wherein said computing the timing metric includes:
    determining a set of adjusted delays based on the set of delays, wherein an adjusted delay for a pin is equal to the greater of the delay for the pin and a required time for the pin if a margin for the pin is equal to zero, wherein the margin for the pin corresponds to the sequential cell, and wherein the adjusted delay for the pin is equal to the greater of the delay for the pin and a maximum allowed delay for the pin if the margin for the pin is greater than zero; and
    determining the timing metric based on the set of adjusted delays.

15. A computer system, comprising:
    a processor; and
    a computer-readable storage medium storing instructions that, when executed by the processor, cause the computer system to perform a method for optimizing a circuit design, the method comprising:
        determining a set of delays corresponding to a set of pins of a candidate sequential cell that is being considered as a replacement for a sequential cell in the circuit design, wherein each delay in the set of delays includes a transition-induced delay component that is computed using a transition-effect coefficient, and wherein each transition-induced delay component estimates an impact that a change in a transition at a pin has on delays of downstream gates; and
        computing a timing metric based on the set of delays, and a non-timing metric based on one or more non-timing parameters of the candidate cell; and
        determining that replacing the sequential cell with the candidate sequential cell improves the circuit design if the timing metric improves, or the non-timing metric improves without degrading the timing metric.

16. The computer system of claim 15, wherein the non-timing metric is based on at least one of: an area of the candidate cell and a leakage power of the candidate cell.

17. The computer system of claim 15, wherein said computing the timing metric includes:
    determining a set of adjusted delays based on the set of delays, wherein an adjusted delay for a pin is equal to the delay for the pin if a margin for the pin is equal to zero, wherein the margin for the pin corresponds to the sequential cell, and wherein the adjusted delay for the pin is equal to the greater of the delay for the pin and a maximum allowed delay for the pin if the margin for the pin is greater than zero; and
    determining the timing metric based on the set of adjusted delays.

18. The computer system of claim 17, wherein the timing metric is a sum of the set of adjusted delays.

19. The computer system of claim 17, wherein the timing metric is a vector of a launch delay and a capture delay, wherein the launch delay is computed by summing delays in the set of adjusted delays corresponding to output pins in the set of pins, wherein the capture delay is computed by summing delays in the set of adjusted delays corresponding to input pins in the set of pins, and wherein the timing metric degrades if either the launch delay or the capture delay degrades.

20. The computer system of claim 17, wherein the timing metric is a vector of the set of adjusted delays, wherein the timing metric degrades if at least one adjusted delay in the vector of the set of adjusted delays degrades.

21. The computer system of claim 15, wherein said computing the timing metric includes:
    determining a set of adjusted delays based on the set of delays, wherein an adjusted delay for a pin is equal to the greater of the delay for the pin and a required time for the pin if a margin for the pin is equal to zero, wherein the margin for the pin corresponds to the sequential cell, and wherein the adjusted delay for the pin is equal to the greater of the delay for the pin and a maximum allowed delay for the pin if the margin for the pin is greater than zero; and
    determining the timing metric based on the set of adjusted delays.

* * * * *